US 6,583,880 B2

(12) United States Patent
Berstis

(10) Patent No.: US 6,583,880 B2
(45) Date of Patent: Jun. 24, 2003

(54) PORTABLE COLORIMETER

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 71 days.

(21) Appl. No.: 09/844,389

(22) Filed: Apr. 27, 2001

(65) Prior Publication Data
US 2002/0159066 A1 Oct. 31, 2002

(51) Int. Cl.[7] .............. G01N 21/25; G01J 3/46
(52) U.S. Cl. .......... 356/407; 356/402; 356/406
(58) Field of Search ................ 356/406, 402, 356/407, 408, 425, 448

(56) References Cited

U.S. PATENT DOCUMENTS

| | | | | |
|---|---|---|---|---|
| 5,751,420 A | * | 5/1998 | Iida et al. | 356/328 |
| 6,040,902 A | * | 3/2000 | Jung et al. | 356/416 |
| 6,070,018 A | * | 5/2000 | Matsushita | 396/225 |
| 6,094,272 A | * | 7/2000 | Okamoto | 250/226 |
| 6,157,454 A | * | 12/2000 | Wagner et al. | 356/407 |
| 6,175,693 B1 | * | 1/2001 | Iida | 396/121 |
| 6,262,804 B1 | * | 7/2001 | Friend et al. | 235/462.45 |
| 6,362,849 B1 | * | 3/2002 | Caisey-Bluteau et al. | 348/222.1 |

* cited by examiner

Primary Examiner—Karl D. Frech
Assistant Examiner—April Nowlin
(74) Attorney, Agent, or Firm—Duke W. Yee; Marilyn Smith Dawkins; Christopher P. O'Hagan

(57) ABSTRACT

A handheld, pen-like colorimeter for measuring the color of an object is provided. The colorimeter includes several light emitters, each with distinct color spectra, wherein the emission of each color is modulated at a specific frequency. These light emitters may be Light Emitting Diodes (LEDs) and/or lasers. The colorimeter also contains at least one light sensor which samples light reflected from an object illuminated by the light emitters. The rate of sampling is at least twice the modulation frequency of the emitted light. A microprocessor computes the fourier transform of the intensity of the reflected light over time, wherein the fourier transform provides the light intensity at each possible modulation frequency and determines the relative contribution of the reflected light from each light emitter, as well as the contribution of ambient light. A color value is calculated and a color name is selected and presented to the user.

20 Claims, 2 Drawing Sheets

PORTABLE COLORIMETER

CROSS REFERENCE TO RELATED APPLICATIONS

The present application is related to co-pending U.S. patent application Ser. No. 09/844,388 entitled "Portable Colorimeter" filed even date herewith. The content of the above mentioned commonly assigned, co-pending U.S. Patent applications are hereby incorporated herein by reference for all purposes.

BACKGROUND OF THE INVENTION

1. Technical Field

The present invention relates generally to methods and devices for the measurement of the color of reflected and emitted light, and particularly to a handheld calorimeter.

2. Description of Related Art

Many fields of endeavor require quick accurate measure of the color of objects, or a comparison between objects. In addition, there are many color blind people that have difficulty accurately judging colors to varying degrees. There are also people who may not be color blind, but have simply not learned all of the subtle color variations and names. When these people read books, work on a computer, shop for clothes, etc., they may not always be able to tell the color of the objects at which they are looking.

Currently, handheld calorimeters are available for measuring the color of an object. These devices measure color by placing the tip of the probe against (or in close proximity to) the surface of the object being measured. The calorimeter generates a single measurement from three data points representing the reflectance of the three primary colors red, green, and blue (RGB). The single color value can then be compared to a preloaded table of color values.

However, current handheld calorimeters have several limitations. Current calorimeters cannot measure color at a distance and have problems handling ambient light. Current methods also have problems with changes in the intensity of artificial lights, such as florescent lights. In addition, the prior art requires recalibration by the user upon every use.

Therefore, it would be desirable to have a handheld calorimeter that can measure the color of distant objects and can properly compensate for ambient light, without the need for constant recalibration.

SUMMARY OF THE INVENTION

The present invention provides a handheld, pen-like colorimeter for measuring the color of an object. The colorimeter comprises several light emitters, each with distinct color spectra, wherein the emission of each color is modulated at a specific frequency. These light emitters may be Light Emitting Diodes (LEDs) and/or lasers. The colorimeter also contains at least one light sensor which samples light reflected from an object illuminated by the light emitters. The rate of sampling is at least twice the modulation frequency of the emitted light. A microprocessor computes the fourier transform of the intensity of the reflected light over time, wherein the fourier transform provides the light intensity at each possible modulation frequency and determines the relative contribution of the reflected light from each light emitter, as well as the contribution of ambient light. The modulation frequency of the light emitters is adjusted to account for the modulation frequency of artificial, ambient light. A color value based on the fourier transform of the reflected light is calculated and then mapped to a list of color values from which a color name is selected and presented to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is a simple pen-like device used to measure the color of reflected light. The pen calorimeter indicates an object's exact color on a liquid crystal display (LCD) on the side of the pen (similar to the displays on clock pens). The invention can be implemented in two ways. The invention can also be implemented as a combination of both methods.

Figure 1A:
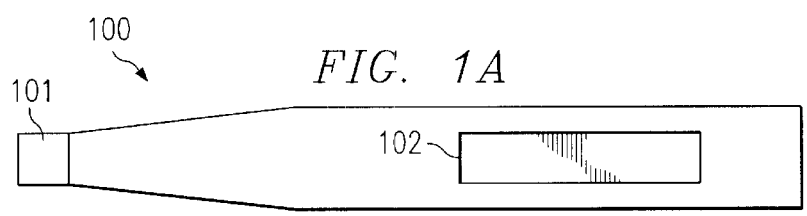
FIGS. 1A and 1B depict schematic diagrams illustrating a handheld, Light Emitting Diode (LED) calorimeter in accordance with the present invention.
Figure 1B:
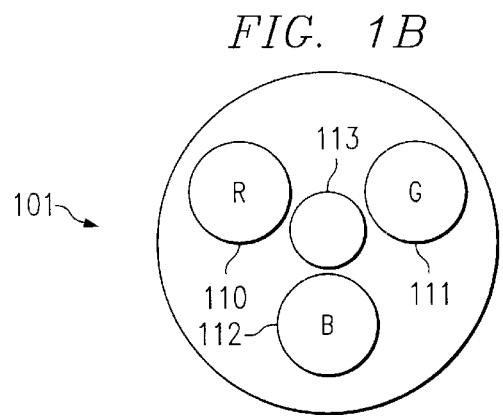

Referring to FIGS. 1A and 1B, schematic diagrams illustrating a handheld, LED calorimeter are depicted in accordance with the present invention. The tip 101 of calorimeter 100 contains three Light Emitting Diodes (LEDs) 110–112, each of which emits a distinct color of light. In the present example, LEDs 110–112 emit red, green, and blue light respectively. Because red, green and blue (RGB) are the primary colors of light, all other colors are a composite of these three colors. Light sensor 113 detects light reflected off the target object.

The illumination from LEDs 110–112 is modulated with a certain frequency. This permits time-varying detection of reflected LED light and the separation of the LED light from the relatively constant ambient light or ambient light from artificial sources which vary with different frequencies. Such an approach can eliminate the need for white balance detection since the reflective component due to the laser illumination can be separated from the ambient light.

Figure 2:
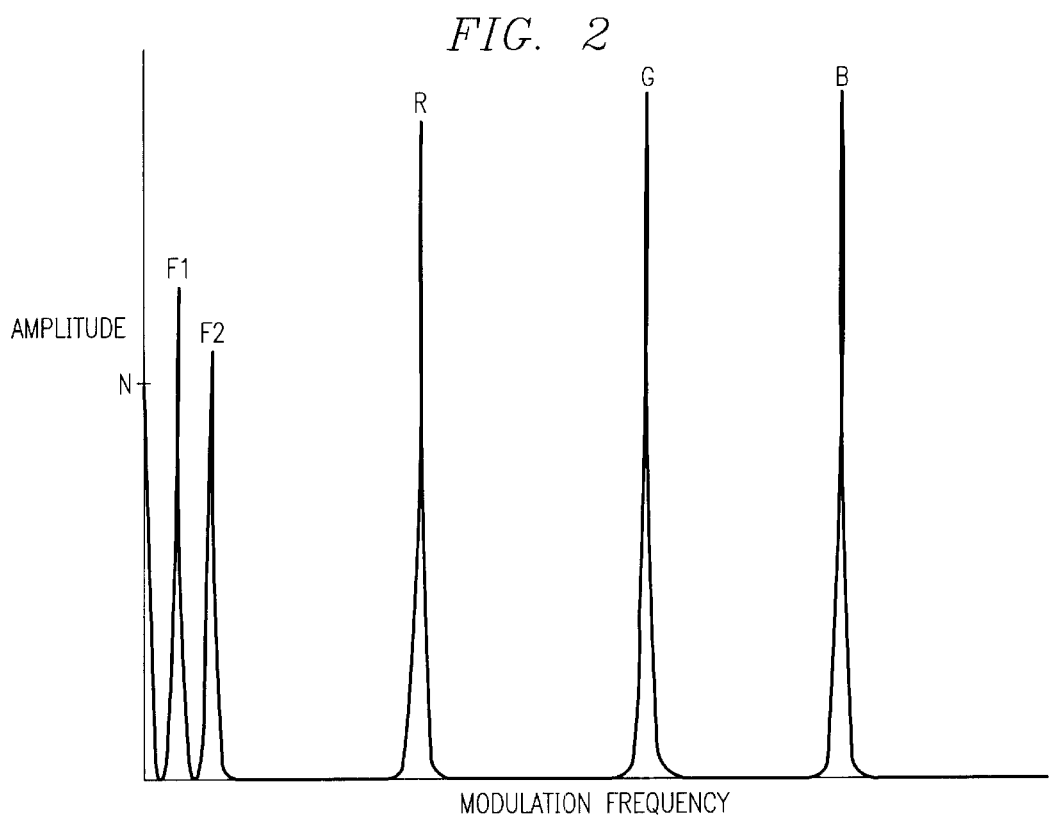
FIG. 2 depicts a graph illustrating fourier transforms based on modulation frequency in accordance with the present invention.

Referring to FIG. 2, a graph illustrating fourier transforms based on modulation frequency is depicted in accordance with the present invention. It should be pointed put that the Graph in FIG. 2 is not drawn to scale. Each of the colored LEDs could be modulated at different frequencies permitting simultaneous measurement of their reflective contribution by examining the (time) fourier transform of the reflected light. There would be three peaks corresponding to the three LEDs, each modulated at a unique frequency. The fourier transform would also reveal ambient light sources that are modulated (e.g. fluorescent lights). If artificial lights appear to be modulated at frequencies too close to the frequencies used to modulate the laser sources, the calorimeter can change the modulation frequency of the LEDs to keep them away from the interfering frequencies of the ambient light.

To implement the frequency modulation, the reflected light is sampled at a frequency greater than twice the modulating oscillation. A fourier transform of the signal will reveal the reflection magnitude at the frequency corresponding to the LED modulation and thus provide a reading of the color component corresponding to the LED source. The fourier transforms gives direct values for the reflected amplitudes of the different emitters. The x axis represents the modulation frequency and the y axis represents the amplitude.

Natural background light will have an amplitude peak N around 0 Hz on the x axis, corresponding to zero frequency modulation (i.e. steady light from the sun). There might also be peaks F1 and F2 around 60 Hz and 120 Hz respectively. These peaks represent the modulation frequencies of artificial background lighting, such as that from fluorescent or other forms of artificial light. For red (R), green (G) and blue (B), each color is modulated with a different frequency. For example, the modulations might be 1000 Hz for R, 2500 Hz for G, and 3700 Hz for B. The height of the graph at x=1000 Hz will give the amount of reflected red light, the height at x=2500 Hz indicates reflected green light, and the height at x=3700 Hz represents the amount of blue reflection. The choice of 1000, 2500, and 3700 Hz might not be the best choice under particular circumstances and are only used for the purpose of illustration. The key is to choose modulation frequencies which are not too close to the frequencies of artificial light sources. In addition, the modulation frequencies of R, G, and B should not be integer multiples of each other or any of the other frequencies a user might encounter (i.e. artificial light). By avoiding the integer multiples, harmonic distortions do not influence the measurement.

Harmonic distortion from slight imperfections in the circuitry, detector response, or non-linearity of the colorimeter's light emitters causes additional bumps to occur in the fourier transform at integer multiples of the modulation frequencies. For example, if the modulation for red is 1000 Hz and green is 2000 Hz, some red measurement could bleed over into green. 1000 Hz might not be a good choice in countries that use 50 Hz power lines. However, since 1000 is 20 times 50, the harmonic distortions might not be significant because the 20th harmonic is usually quite weak. The higher the harmonic, the lower the interference.

A microprocessor in calorimeter 100 matches the fourier transforms of the reflected LED light to a color name and displays the name on the LCD display 102 on the side of the colorimeter 100. The color name might also be presented to the user by means of an audio speaker employing Text-to-Speech (TTS) technology. The color names can be stored in a table in internal memory, or in an external source to which the calorimeter 100 is connected.

Prior art calorimeters require the user to recalibrate the calorimeter every time the device is used, using either a white or black surface. The present invention, by contrast, allows the user to maintain calibration in memory, thus eliminating the need for constant recalibration with each use.

The present invention may also include a focus option to allow the user to average the colors over a larger area in order to measure the general color of a finely colored or patterned area.

In addition to RGB, the present invention may also measure colors outside the visual spectrum, such as infrared (IR) and ultraviolet (UV). A calorimeter which includes IR or UV may prove useful in medical fields when trying to assess the health of tissues or in agricultural fields when monitoring the health of plants. Other examples include geological application for determining mineral content, especially at a distance, i.e. a rock wall.

Depending on the needs of the client, additional functions may be added to the present invention. One such option is storing measured colors in memory. This would permit the user to annotate the measurement with something as simple as a digit or number, or with something more complex, such as text or a voice clip description. These options may require more powerful microprocessors, extra interface devices (i.e. microphone, keypad, buttons, etc.), and additional memory. However, such additional features and expenses might be reasonable for particular applications (e.g. medical diagnosis or manufacturing quality control).

Another additional function that can be added to the present invention is the use of algorithms to coordinate colors of different objects. The algorithms would tell the user which colors could go with other stored colors in particular situations. An obvious application of this function is wardrobe selection, for both professional as well as home use.

Additionally, functions could translate the color measurement into something other than a color name. The calorimeter may use the color to identify the object being measured. For example, in a clothing store, each kind of garment may have a different possible set of color choices and thus a certain color measurement may translate into "Cambridge rugby shirt" or other appropriate name. As another example, industrial and commercial users may find it convenient to color code component parts and color code package containers according to delivery priority or destination.

Figure 3A:
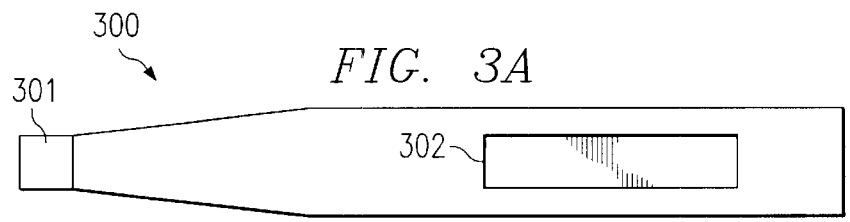
FIGS. 3A and 3B depict schematic diagrams illustrating a handheld, laser calorimeter in accordance with the present invention.
Figure 3B:
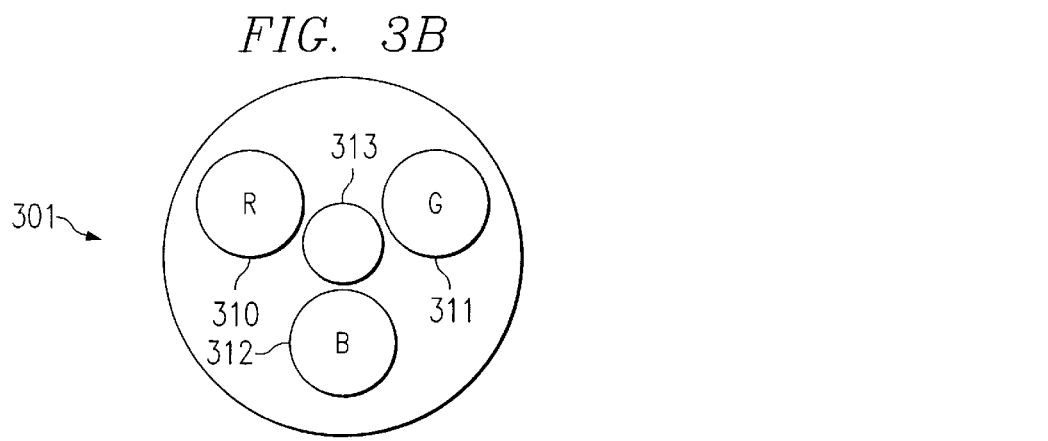

Referring to FIGS. 3A and 3B, schematic diagrams illustrating a handheld, laser colorimeter are depicted in accordance with the present invention. FIG. 3B illustrates the front of tip 301 which contains the color-measuring components. The basic design of colorimeter 300 is similar to calorimeter 100. However, whereas calorimeter 100 uses LEDs 110–112, calorimeter 300 employs RGB laser diodes 310–312. Prior art calorimeters which rely on light emitting diodes (LEDs) cannot measure color at a substantial distance because the LEDs cannot illuminate objects far away. The use of laser diodes in the present invention overcomes this shortcoming because lasers can maintain focused beams over greater distances than prior art, which is why lasers are employed in range finders and targeting systems.

In the present example, laser diodes 310, 311, and 312 emit red, green and blue light (or other appropriate colors suitable for color measurement) respectively. The laser diodes 310–312 shine on the object one at a time, while a special laser sensing diode 313 measures the reflected light. To facilitate color measurement at long range, light sensor 313 might also include a telephoto lens.

A microprocessor inside the body of colorimeter 300 computes the RGB fourier transforms, correcting for sensitivity and calibration. The microprocessor then matches the fourier transforms to a color name and displays the name on the LCD display 302 on the side of the calorimeter 300, similar to calorimeter 100.

An infrared laser diode can also be added to calorimeter 300 to extend the color spectrum measured.

Figure 4A:
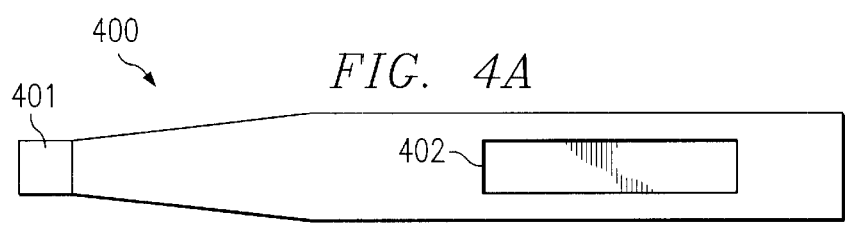
FIGS. 4A and 4B, schematic diagrams illustrating a handheld calorimeter employing both LEDs and lasers are depicted in accordance with the present invention.
Figure 4B:
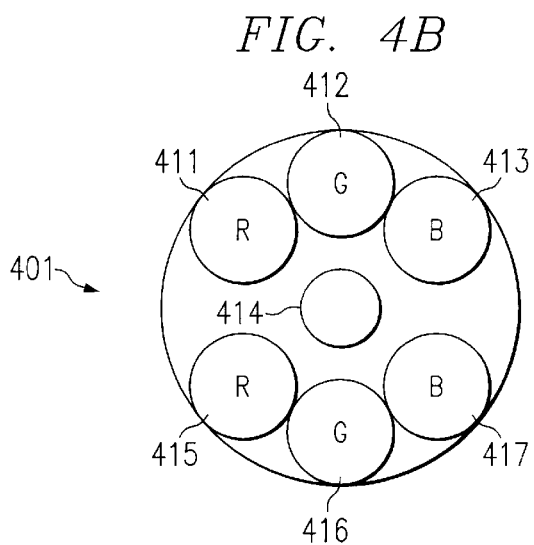

Referring to FIGS. 4A and 4B, schematic diagrams illustrating a handheld calorimeter employing both LEDs and lasers are depicted in accordance with the present invention. This embodiment of the present invention combines the features of the previous two embodiments. The tip 401 of calorimeter 400 contains RGB laser diodes 411–413 and light sensor 414 as well as RGB LEDs 415–417.

The technology represented by the pen-like devices described above may be applied in other handheld formats. For example, the colorimetry technology of the present invention could add color measurement features to digital still cameras and video cameras or camcorders. The user presses a button and moves a target indicator over a part of a recorded image or viewfinder image to choose an item or area for color measurement. This can be accomplished by using the LCD display and scrolling button that typically appear on these cameras. This process works well at a distance, uses the camera's existing white balance capabilities, and allows for more options involving memory and processing. Digital cameras typically include powerful microprocessors to compress the images and large storage devices to hold the images. The camera can also be placed in a mode for continuous color measurement of a central or general portion of the current electronic viewfinder. The text description of the color measurement can be superimposed on the viewfinder image as well as optionally on the recorded image, or on a separate display device on the camera. The text can include the raw RGB values as wells as color names and information comparing the measured color(s) to those previously stored for comparison, matching, or other purposes.

The color coordination and comparison features described above can also be added to video colorimetry and applied to cinematography. Such an application could be particularly important in light of the recent introduction of digital motion picture cameras.

Typically, digital cameras are also sensitive to infrared light and this capability could be better exploited using the present invention to achieve superior results over the current state of the art primarily in medical, or other scientific fields.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A handheld colorimeter for measuring the color of an object, comprising:
    a plurality of light emitters, each with distinct color spectra, wherein the emission of each color is modulated at a specific frequency;
    at least one light sensor which samples light reflected from an object illuminated by said light emitters, wherein the rate of sampling is at least twice the modulation frequency of the emitted light;
    a microprocessor which computes the fourier transform of the intensity of the reflected light over time, wherein the fourier transform provides the light intensity at each possible modulation frequency and determines the relative contribution of the reflected light from each light emitter;
    a calculating component which calculates a color value based on the fourier transform of the reflected light;
    a mapping component which maps the color value to a list of color values and selects a color name from the list that matches the composite color value; and
    a presenting component which presents the color name to a user.

2. The colorimeter according to claim 1, wherein the light emitters are light emitting diodes.

3. The colorimeter according to claim 1, wherein the light emitters are lasers.

4. The colorimeter according to claim 1, wherein the colors emitted by the light emitters are red, green, and blue.

5. The colorimeter according to claim 1, wherein the presenting component is a liquid crystal display in a side of the colorimeter.

6. The colorimeter according to claim 1, wherein the presenting component is an audio speaker on the side of the colorimeter.

7. The colorimeter according to claim 1, wherein modulation frequency is used to distinguish ambient light from light emitted from the colorimeter.

8. The colorimeter according to claim 1, wherein the modulation frequency of the light emitters is adjusted to account for ambient light.

9. The colorimeter according to claim 1, further comprising a calibration component which calibrates the colorimeter and stores the calibration settings in memory.

10. The colorimeter according to claim 1, wherein the light sensor further comprises a telephoto lens.

11. The colorimeter according to claim 1, further comprising an infrared light emitting diode.

12. The colorimeter according to claim 1, further comprising an infrared laser.

13. The colorimeter according to claim 1, further comprising an ultraviolet light emitting diode.

14. The colorimeter according to claim 1, further comprising a focus adjuster which adjusts the focus of the light sensor and averages the colors over a specified area.

15. The colorimeter according to claim 1, further comprising a storage component which stores measured colors in memory, wherein the measurements can be annotated by the user.

16. The colorimeter according to claim 1, further comprising an algorithm to match and coordinate colors of different objects.

17. The colorimeter according to claim 1, wherein the list of color values and corresponding name is stored in internal memory.

18. The colorimeter according to claim 1, wherein the list of color values and corresponding name is stored in an external memory source.

19. The colorimeter according to claim 1, wherein the colorimeter is incorporated into a camera.

20. A method for measuring the color of an object, comprising:
    shining a plurality of light emitters, each with distinct color spectra, on an object, wherein the emission of each color is modulated at a specific frequency;
    sampling light reflected from an object illuminated by said light emitters, wherein the rate of sampling is at least twice the modulation frequency of the emitted light;
    computing the fourier transform of the intensity of the reflected light over time, wherein the fourier transform provides the light intensity at each possible modulation frequency and determines the relative contribution of the reflected light from each light emitter;
    calculating a color value based on the fourier transform of the reflected light;
    mapping the color value to a list of color values and selecting a color name from the list that matches the composite color value; and
    presenting the color name to a user.

* * * * *